United States Patent [19]

Heightley

[11] 3,725,687

[45] Apr. 3, 1973

[54] THRESHOLD LOGIC DIGITAL FILTER

[75] Inventor: John Donnell Heightley, Basking Ridge, N.J.

[73] Assignee: Bell Telephone Laboratories, Incorporated, Murray Hill, Berkeley Heights, N.J.

[22] Filed: Mar. 4, 1971

[21] Appl. No.: 120,829

[52] U.S. Cl. ....................................235/164, 328/167
[51] Int. Cl. ................................................G06f 7/38
[58] Field of Search .......235/164, 156; 328/167, 165

[56] References Cited

UNITED STATES PATENTS 3,609,568 9/1971 Jackson ...........................235/156 X
3,521,041 7/1970 Blerkom et al. ..................235/164 X
3,521,042 7/1970 Blerkom et al. ..................235/164 X
3,619,586 11/1971 Hoff, Jr. ..............................235/156

*Primary Examiner*—Malcolm A. Morrison
*Assistant Examiner*—David H. Malzahn
*Attorney*—R. J. Guenther and Kenneth B. Hamlin

[57] ABSTRACT

A threshold logic digital filter converts an input sequence of sets of bits representing amplitudes of a continuous signal at predetermined sample times into another sequence of sets of bits representing the input sequence of sets transformed by a predetermined difference equation. Storage-processor elements are used for implementing threshold logic adder, multiplier, two's-compartment, and overflow detector circuits in the digital filter.

8 Claims, 14 Drawing Figures

INVENTOR
J. D. HEIGHTLEY
BY Richard B. Havill
ATTORNEY

THRESHOLD LOGIC DIGITAL FILTER

BACKGROUND OF THE INVENTION

1. Field of the Invention

The invention is a digital filter that is more particularly described as a threshold logic digital filter for processing binary-coded amplitude samples of a continuous waveform.

2. Description of the Prior Art

Many digital filter configurations are known in the prior art. Such filters are described at length by B. Gold and C. M. Rader in their text, entitled "Digital Processing of Signals," McGraw-Hill, Inc., 1969 and by L. B. Jackson, J. F. Kaiser, and H. S. McDonald in an article, entitled "An Approach to the Implementation of Digital Filters," *IEEE Transactions on Audio and Electroacoustics*, Vol. AU-16, No. 3, Sept. 1968, pp. 413–421.

The digital filters, described in the aforementioned text and article, perform a series of arithmetic processes on groups of signals, each group of signals being a binary number representation of the amplitude of a discrete sample of an analog signal taken at a definite time. Some of the filters include multiple loops for performing binary addition, two's-complementing, and multiplication processes on the groups of signals. Each of these arithmetic processes may be performed serially or in parallel. Each group of signals has a limited number of bits because only a limited number of binary places are provided in the processing and storage circuitry.

As just mentioned, binary addition is one of the arithmetic processes of digital filters. Therefore, binary adders are included in the loops for adding groups of bits together. Such adders usually process sample words in a two's-complement code which is well suited for the addition process.

Digital filters also convert sample words from the two's!-complement representation to a sign-magnitude representation and vice-versa. Both of these conversions are accomplished by two's-complement circuits. Two's-complement coding is discussed extensively by Ivan Flores in Chapter 3 of his text, entitled "The Logic of Computer Arithmetic," Prentice-Hall, Inc., 1963.

Briefly, however, $n$ bits are used for representing each number in both representations. Of the $n$ bits, the last and most significant bit represents the sign of the number, and the $n-1$ least significant bits represent the magnitude of the number. When the most significant bit is a zero, it indicates that the number is a positive number. Conversely when the most significant bit is a one, the number is a negative number.

Except for the sign bit convention just mentioned, the sign-magnitude representation of any number is identical to the magnitude of the ordinary binary number.

Positive numbers have a two's-complement representation which is identical to the sign-magnitude representation of the same number.

Negative numbers, on the other hand, have a two's-complement representation which is expressed by complementing all magnitude bits of the sign-magnitude representation of that number and increasing the resulting complemented number by one.

A third arithmetic process of digital filters is a multiplication of sample code words by predetermined binary coefficients. Therefore, binary multipliers are used in the loops of digital filters. Such multipliers often process sample words expressed in the sign-magnitude representation, which is well suited for the multiplication process.

The two's-complement process mentioned previously is required in the digital filter to perform code conversions so that the adders and the multipliers operate on code words that are best suited for their particular arithmetic operations.

In addition to the arithmetic processing performed by digital filters, it is necessary to check the results of the arithmetic processes to determine whether or not a net overflow has occurred in the filter.

Overflows occur in the multipliers and in the adders whenever the magnitude of a product or sum requires, for properly representing the product or sum, more bits than the limited range of bit places provided in the circuitry of the digital filter. Such overflows and any resulting net overflow in a filter loop must be detected. The sample code word which is subjected to a net overflow must be modified to compensate for the net overflow. Such compensation prevents oscillations in the output of the digital filter.

Heretofore all of the aforementioned addition, multiplication, two's-complement, and overflow detection processes in digital filters have been performed by well-known Boolean logic circuits. These processes are so complicated, however, that they require extensive Boolean logic circuits.

It is desirable to develop a new way of implementing those processes so that a less complicated logic arrangement can perform all of the same processes by means of circuits that are less expensive than the known Boolean logic circuits.

SUMMARY OF THE INVENTION

This and other objects of the invention are achieved by a threshold logic digital filter system which converts an input sequence of sets of bits, representing amplitude samples of a continuous signal at predetermined times, into an output sequence of sets of bits, representing the input sequence of sets of bits transformed by a predetermined difference equation. Storage-processor elements are used for implementing threshold logic adder, multiplier, two's-complement, and overflow detection circuits in the digital filter system.

A feature of the invention is a digital filter comprising a combination of threshold logic circuits.

Other features of the digital filter include circuit loops containing threshold logic adders, threshold logic two's-complement circuits, and threshold logic multipliers.

A further feature is a digital filter including a threshold logic overflow detection circuit.

BRIEF DESCRIPTION OF THE DRAWINGS

A better understanding of the invention may be derived from the detailed description following if that description is considered with respect to the attached drawings in which.

DETAILED DESCRIPTION

Figure 1:
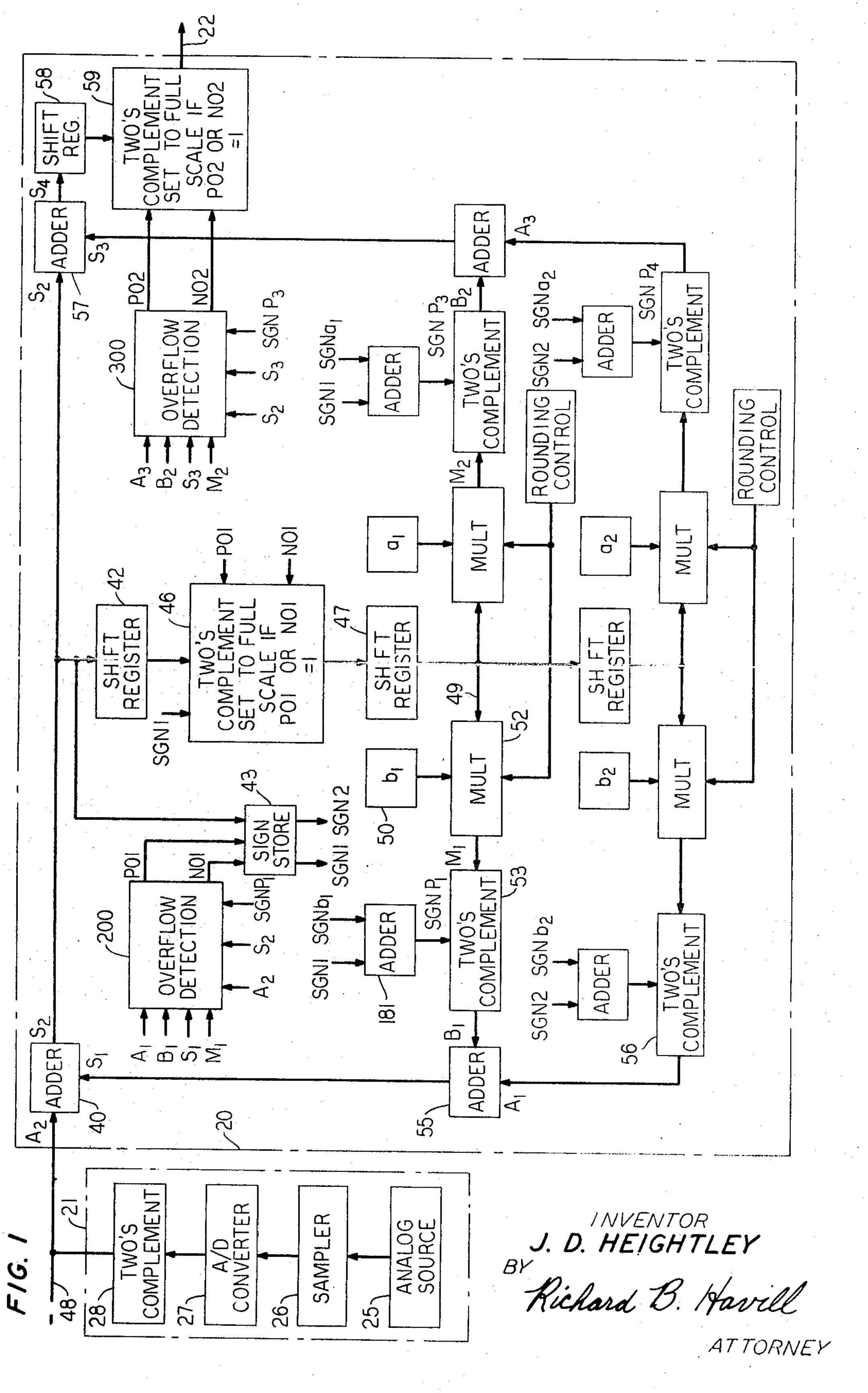
FIG. 1 is a block diagram of a digital filter in accordance with the invention.

Referring now to FIG. 1, there is shown a digital filter 20, which receives from an input circuit 21 binary coded sample words representing amplitudes of an analog signal, which processes those words recursively, and which produces at the output 22 code words representing the received sample words transformed by a predetermined transfer function.

The input circuit 21 includes an analog signal source 25 producing a continuous analog signal. At a predetermined time $t = nT_s$, a sampler 26 samples the amplitude of the continuous signal from source 25. An analog pulse having an amplitude $x(nT_s)$ is transferred through the sampler 26 and is applied to an analog-to-digital (A/d) converter 27, which changes the analog pulse to an equivalent binary number. This binary number is in turn converted to its two's-complement representation by a two's-complement circuit 28.

Thus, a sample code word, representing the amplitude sample of the continuous analog signal from the source 25, is applied to the input of the digital filter 20.

The filter 20 is arranged in four loops for processing the received sample code word recursively in an algorithm described by the second order of a well-known general difference equation:

$$y_n = \sum_{k=0}^{k=m} a_k x_{n-k} - \sum_{k=1}^{k=p} b_k y_{n-k}$$

This equation defines an output amplitude $y(nT_s)$ as a function of the present input sample amplitude $x(nT_s)$ and a number of past input and output sample amplitudes. In the equation, $x_n$ and $y_n$ respectively have been substituted for $x(nT_s)$ and $y(nT_s)$ with the understanding that $n$ refers to the time $t = nT_s$. The $a_k$ and $b_k$ are coefficients. The variable $k$ refers to a series of integers, and any $n-k$ is a specific earlier sample period.

The processing of the algorithm for $m = p = 2$ is performed by the digital filter 20, which produces at the output 22, output code words representing the input code word sequence transformed by the algorithm.

The aforementioned difference equation can be converted into a predetermined frequency domain transfer function in the following form:

$$H(\omega) = \frac{y(\omega)}{x(\omega)} = \frac{\sum_{k=0}^{k=m} a_k \epsilon^{-jk\omega T}}{1 + \sum_{k=1}^{k=p} b_k \epsilon^{-jk\omega T}}$$

where $\epsilon^{-jk\omega T}$ represents a delay of $kT$. This transfer function is the ratio of the output signal $y(\omega)$ divided by the input signal $x(\omega)$. The coefficients $a_k$ and $b_k$ determine the magnitude and phase characteristics of the digital filter 20.

Since the filter 20 includes two upper loops and two lower loops all containing processing circuits performing similar arithmetic functions, only the processing circuits of the upper left-hand loop are to be described in detail hereinafter. It is to be understood that similar circuits can be inserted readily into the other three loops of filter 20.

In the upper left-hand loop of the filter 20, an input sample code word $A_2$ in two's-complement representation is applied in serial with the least significant bit first to a threshold logic adder 40 as an addend. A sample code word $S_1$, which is the result of processing prior samples by both left-hand loops, concurrently is applied to the adder 40 as an augend. The adder serially produces the sum of the addend and augend as a sum code word $S_2$ which is forwarded around the loop. This adder circuit requires only one clock cycle for producing the sum of two input bits, but the output bit stream is delayed by an additional clock cycle.

In the upper left-hand loop, the bits of the sum code word $S_2$ are applied serially to a shift register 42, which includes enough stages to store all bits of one sum code word $S_2$ plus three additional bits. The sign bit SGN 1 of the sum code word is stored in a sign store 43, as well as in the shift register 42.

When shifted out of the shift register 42, the delayed serial bit stream of the sum code work $S_2$ is applied to a threshold logic two's-complement circuit 46 for conversion to sign-magnitude representation. The circuit 46, like the adder 40, requires only one clock cycle for the conversion, but the bit stream of the sum code word is delayed in the circuit 46 by an additional clock cycle.

The bit stream in sign-magnitude representation from the circuit 46 then is applied to another shift register 47 for further delay so that at least one other code word can be processed concurrently by the filter 20. The other code word is a word that is time multiplexed with the sample from circuit 21 by way of another input circuit 48. The circuit 48, like the circuit 21, applies input signals coded in two's-complement representation to the filter 20.

When the sum code word has stepped through the shift register 47, it is applied serially by way of path 49 to a threshold logic serial multiplier 52 as a multiplicand. A predetermined binary coefficient $b_1$, stored in a memory 50, is read out of the memory and also is applied to the multiplier 52. The magnitudes of the sample word and the coefficient $b_1$ are multiplied bit by bit during an interval including several clock cycles.

A resulting product code word from the multiplier 52 is a sign-magnitude bit stream that is applied directly to another threshold logic two's-complement circuit 53 which converts the product code word into its two's-complement representation under control of a product sign bit SGN $P_1$. The product sign bit SGN $P_1$ is derived from the sum code word sign bit SGN 1, previously stored in the sign store 43, and a sign bit SGN $b_1$ of the coefficient $b_1$. The circuit 53 is similar to the previously mentioned two's-complement circuit 46.

The resulting two's-complement code word is applied to a second threshold logic adder 55 as an addend $B_1$. An augend $A_1$ concurrently is applied to the adder 55 from another two's-complement circuit 56 located in the lower left-hand loop of the digital filter 20. The adder 55 serially produces a sum of the addend $B_1$ and augend $A_1$ in one clock cycle, delays the bits of the resulting sum code word $S_1$ by one additional clock cycle, and forwards the resulting sum code word $S_1$ to the adder 40 as the augend $S_1$.

There are sufficient stages of delay around the upper left-hand loop so that the resulting sum code word $S_1$ from the adder 55 concurs with a new sample code word $A_2$ representing a new sample taken from the continuous analog signal of source 25 by the sampler 26 during the next sampling period.

The sum code word $S_2$ resulting from adding the augend $S_1$ to the new sample code word $A_2$ is forwarded to the shift register 42. In addition the sum code word $S_2$ is applied to an adder 57 as an addend together with an augend $S_3$ from the right-hand loops. The adder 57 produces an output code word $S_4$ that is delayed by a shift register 58 and converted by a two's-complement circuit 59. The resulting code word sequence at output 22 represents substantially all of the information contained in an output signal of a predetermined analog filter operating on the analog signal from source 25.

As previously mentioned the lower left-hand loop and the two right-hand loops of the digital filter 20 contain processing circuits similar to the circuits of the upper left-hand loop. Further description of those additional loops is omitted because their arrangement and operation should be readily understood as a result of the foregoing description when that description is considered in view of subsequently described individual circuits of the upper left-hand loop.

All of the major processing circuits in the four loops of the filter 20 can be synthesized by means of a basic building block storage-processor element (SPE), which both stores and processes information bits.

Figure 2:
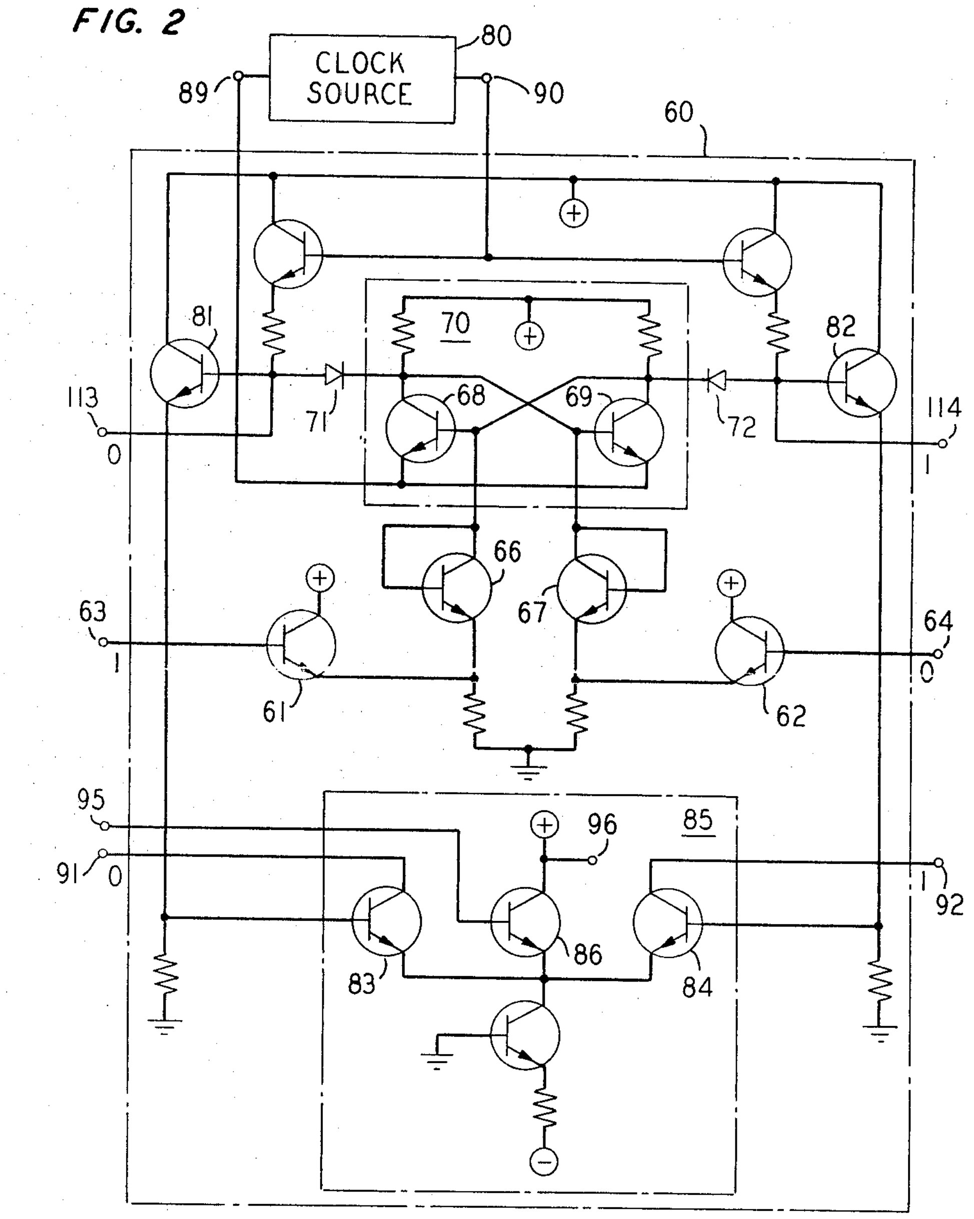
FIG. 2 is a schematic diagram of a storage-processor element used in the digital filter.

Referring now to FIG. 2, there is shown a schematic diagram of a storage-processor element 60 which is designed so that groups of such elements can be interconnected to form the various data processing circuits included in the digital filter 20 of FIG. 1.

The element 60 of FIG. 2 includes transistors 61 and 62 arranged as a pair of emitter-follower circuits for coupling double-rail input signals applied to input terminals 63 and 64 into the storage-processor element 60. Diode-connected transistors 66 and 67 couple potential levels from the emitters of transistors 61 and 62, respectively, to base electrodes of transistors 68 and 69, which are the active devices of a flip-flop circuit 70. The flip-flop circuit 70 is arranged to make decisions regarding which one of the transistors 61 and 62 has a higher potential on its emitter and for storing the results of those decisions. Diodes 71 and 72 couple the outputs of the flip-flop 70 to transistors 81 and 82. The transistors 81 and 82 are connected as emitter-follower circuits, each of which stores on its parasitic base capacitance a quantity of charge that is dependent upon the conduction state of the flip-flop 70. The emitters of the transistors 81 and 82 are connected, respectively, to the bases of transistors 83 and 84 in a current steering circuit 85.

This steering circuit 85 is a conventional steering circuit having an additional transistor 86 for enabling and disabling the output of the steering circuit 85. Output signals from the element 60 are manifested as a predetermined magnitude of current steered through one or the other of a pair of output terminals 91 and 92 by the steering circuit 85.

Figure 6:
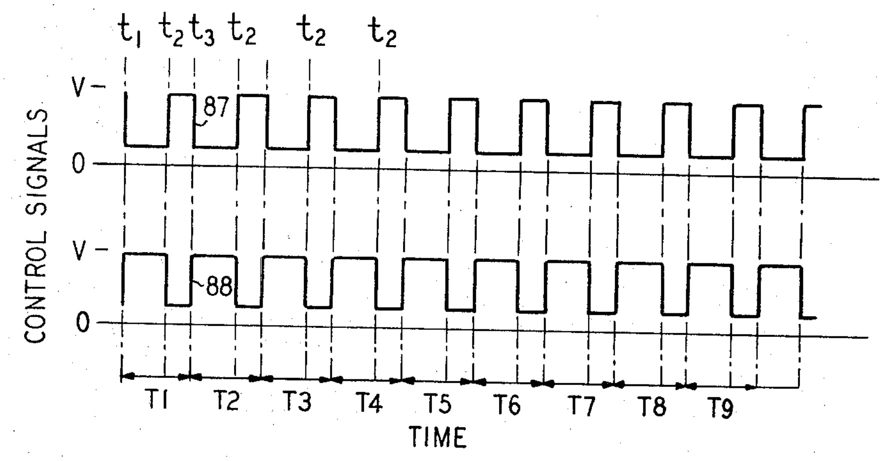
FIG. 6 is a timing diagram for signals used to drive the elements of the digital filter.

The storage-processor element 60 is driven by two control signals 87 and 88 of FIG. 6. Those control signals are applied by a clock source 80 respectively to terminals 89 and 90 of element 60 in FIG. 2. The storage-processor element 60 operates cyclically in response to the waveforms of FIG. 6. Several clock cycles, such as T1, T2, etc., are shown in FIG. 6.

In operation, information is transferred into the element 60 of FIG. 2 and is stored therein when the control signal 87 changes to its low level and the control signal 88 changes to its high level at the time $t_1$ of clock cycle T1. The information is stored in the element 60 from the time $t_1$ until time $t_2$ of clock cycle T1 while the control signals 87 and 88, respectively, remain low and high. As long as storage continues, the state of the flip-flop 70 is coupled to the output terminals 91 and 92, and a charge is stored on the parasitic capacitances of the bases of transistors 81 and 82, shown in FIG. 2.

At time $t_2$ of clock cycle T1 in FIG. 6, the flip-flop 70 of FIG. 2 is decoupled from the transistors 81 and 82 by the diodes 71 and 72. At time $t_3$ of clock cycle T1 when the signals 87 and 88, respectively, return to low and high levels, the state of the flip-flop 70 is changed in response to the state of information received by way of the input terminals 63 and 64.

A more detailed description of the operation of the storage-processor element 60 is presented in a copending patent application, Ser. No. 120,834, filed on Mar. 4, 1971 in the name of John D. Heightley.

As previously mentioned, the element 60 is designed so that groups of such elements can be interconnected into data processing arrangements. Such arrangements include the threshold logic adders, the threshold logic two's-complement circuits, the threshold logic multipliers, and the threshold logic overflow detection circuits used in the digital filter 20 of FIG. 1.

Figure 3:
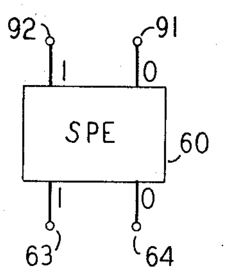
FIG. 3 is a symbolic diagram of the storage-processor element of FIG. 2.

Referring now to FIG. 3, there is shown a symbolic block 60 which represents the storage-processor element 60 of FIG. 2. The block 60 in FIG. 3 has input and output terminals 63, 64, 91 and 92 which are the same as the terminals shown in FIG. 2 and are identified in FIG. 3 by indicator numerals identical to the numerals used in FIG. 2. Output terminals 91 and 92 in FIG. 3 have been transposed from the positions they occupy in FIG. 2 so that a 1 input will produce a 1 output on the same side of the block 60. Such a transposition facilitates interconnections between groups of storage-processor elements in block diagrams to be described hereinafter.

Although the control signal input terminals 89 and 90 of FIG. 2 are omitted from the block 60 of FIG. 3, it is to be understood that control signals, similar to those of FIG. 6, are applied to the block 60 of FIG. 3 as they are applied to the terminals 89 and 90 of the element 60 in FIG. 2.

Gate control input terminal 95 of the storage-processor element 60, shown in FIG. 2, is omitted from the block 60 of FIG. 3 indicating that the enabling and disabling function of the element 60 is not utilized and therefore may be omitted from the circuit of block 60.

Figure 4:
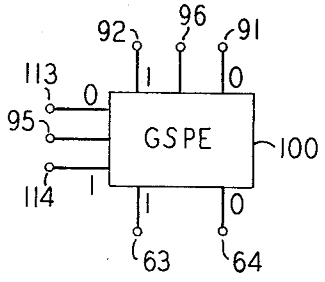
FIG. 4 is a symbolic diagram of the element of FIG. 2 used as a gated storage-processor element.

Referring now to FIG. 4, there is shown another symbolic block 100 representing the element 60 of FIG. 2. The block 100 in FIG. 4 is similar to the block of FIG. 3 except that the input and output terminals 95 and 96 of the control gate are shown. Output terminals 113 and 114 also are shown. The block 100 thus indicates that the entire storage-processor element 60 of FIG. 2 is utilized in the block 100 so that the block 100 functions as a gated storage-processor element. The letters GSPE are included in the block 100 to indicate that it is a gated storage-processor element in contrast to the block 60 of FIG. 3, which is a storage-processor element that is indicated by enclosed letters SPE. To disable the output from terminals 91 and 92, the gate signal applied to terminal 95 must be a higher positive level than both of the input data signals applied to terminals 63 and 64.

The output terminal 96 of the control gate may be connected directly to the power supply, as shown in FIG. 2, or may be connected indirectly to a power supply by way of a direct connection to one or the other of the output terminals 91 and 92. Such a connection to an output terminal leads indirectly to a power supply by way of a threshold logic bus and a resistive coupling circuit.

In threshold logic data processing circuits described subsequently, the output terminal 96 of the gated storage-processor element 100 is omitted whenever the terminal 96 is connected directly to the power supply and is shown, like it is shown in FIG. 4, whenever the terminal is connected to one of the output terminals 91 and 92.

Output terminals 113 and 114 of the block 100 in FIG. 4 are connected to the anodes of the diodes 71 and 72 in FIG. 2 and are used for shifting operations only. Signals produced on output terminals 113 and 114 have not been processed through the output steering circuit 85 of FIG. 2.

Figure 5:
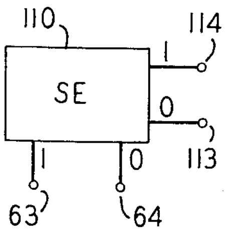
FIG. 5 is a symbolic diagram of the element of FIG. 2 used as a storage element.

Referring now to FIG. 5, there is shown another symbolic block 110 representing another alternative arrangement of the element 60 of FIG. 2. The symbolic block 110 of FIG. 5 represents a storage element (SE) which is only a portion of the entire storage-processor element (SPE) of FIG. 2. The storage element (SE) of FIG. 5 uses the output terminals 113 and 114 as its output terminals rather than using the terminals 91 and 92. As a result, the emitter followers 81 and 82 and the steering circuit 85 shown in FIG. 2 can be eliminated from the circuit of the storage element 110 at the discretion of the fabricator. These parts of the element 60 of FIG. 2 are not required because the block 110 is used merely to delay bits without processing or steering them into a threshold logic circuit.

Figure 7:
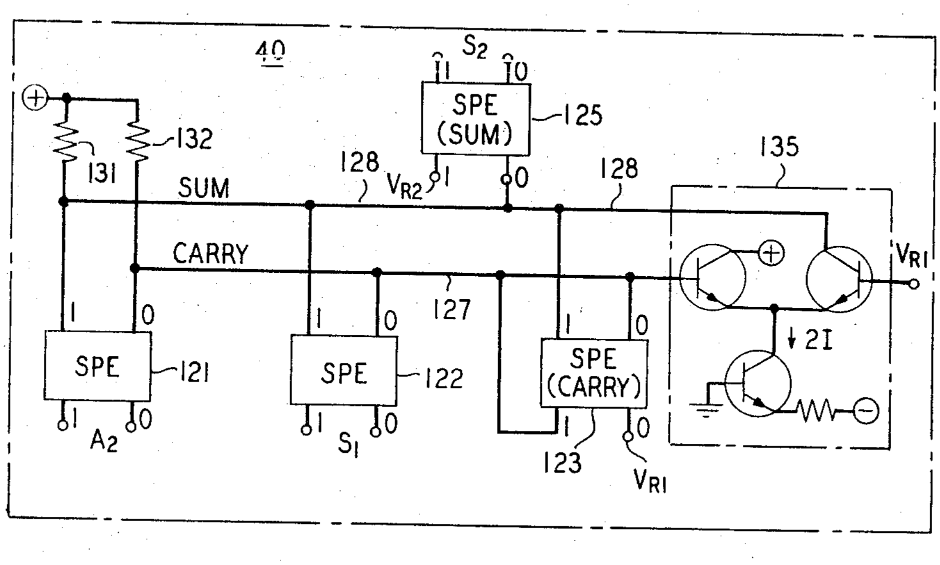
FIG. 7 is a block diagram of a threshold logic serial adder circuit.

Referring now to FIG. 7, there is shown a a block diagram of the threshold logic adder 40 that is used in the digital filter of FIG. 1. Input signals applied to the adder 40 include the addend $A_2$ and the augend $S_1$ which are two's-complement code words representing sequential amplitude samples being processed by the digital filter. The addend and augend code words $A_2$ and $S_1$ are applied to the adder 40 in serial bit streams with the least significant bit first and the most significant bit last. The last bit of each word is the sign bit which, as previously stated, is a 0 if the word represents a positive number and is a 1 if the word represents a negative number.

As each bit of the addend $A_2$ is applied to the adder 40, there is a similar order bit of the augend $S_1$ fed back from the left-hand loops and also applied to the adder 40. These bits of the addend $A_2$ and the augend $S_1$ are applied respectively to storage-processor elements 121 and 122 and are stored therein in response to the changes of the control signals at the times $t_2$ and $t_3$ of FIG. 6 in the clock cycle during which the bits are available.

In FIG. 7, carry storage is accomplished by another storage-processor element 123. The element 123 determines whether a carry is generated or not and stores the decision until a transfer occurs in the next subsequent clock cycle. During such subsequent clock cycle any carry bit presently stored in the element 123 is added to the addend and the augend bits presently stored in the elements 121 and 122. A resulting sum bit is determined and stored in a sum storage-processor element 125 during the next subsequent clock cycle.

A sum word $S_2$ is a two's-complement code word representing the summation of the addend code word $A_2$ and the augend code word $S_1$. The bits of the sum code word $S_2$ of the adder 40 are arranged in a serial stream with the least significant bit first and the most significant bit last.

Since all of the elements of the adder of FIG. 7 operate in response to control signals like the control signals shown in FIG. 6, a typical operation includes concurrently storing input bits in the input storage-processor elements 121 and 122. While stored in the flip-flops of the elements 121 and 122, the input bits cause a unit of current from each of the elements 121 and 122 to be steered to one or the other of a pair of threshold logic busses 127 and 128. A power supply and a pair of resistors 131 and 132 cause potential on the busses 127 and 128 to vary as the number of units of current conducted through those busses varies.

Potential on the carry bus 127 and a reference potential $V_{R1}$ are applied respectively to the 1 and 0 inputs of the carry element 123 for determining what carry bit will be stored in the element 123 at the time $t_3$ of the next subsequent clock cycle. While stored in the element 123, the carry bit determines whether a unit of current is conducted through the 1 output to the sum bus or through the 0 output to the carry bus.

The potential on the carry bus 127 and the reference potential $V_{R1}$ are also applied to opposite inputs of a steering circuit 135 which steers two units of current to the sum bus 128 only when at least two units of current are conducted through the carry bus 127. These units of current in the carry bus are steered to the carry bus by any of the elements 121, 122 and 123, which store a 0.

Potential on the sum bus 128 and a reference potential $V_{R2}$ are applied respectively to the 0 and 1 input terminals of the sum element 125 for determining whether a 1 or a 0 sum bit will be stored in the element 125 at the time $t_3$ of the next subsequent clock cycle. The sum bus potential is determined by the number of units of current conducted therethrough under control of the elements 121, 122, and 123 and under control of the steering circuit 135.

When the time $t_3$ occurs, new bits are stored in the elements 123 and 125. The carry element 123 stores a 1 only if less than two units of current are conducted through the carry bus 127 when the time $t_3$ occurs. The sum element 125 stores a 1 only if at least three units of current concurrently are conducted through the sum bus 128 when the time $t_3$ occurs.

As soon as the new sum bit is stored in the sum element 125, that element steers a unit of current to one or the other of its output terminals 1 and 0 depending upon whether the stored bit is a 1 or a 0.

As an alternative arrangement, the elements 121, 122, and 123 can have their 1 and 0 outputs respectively connected to the carry and sum busses. The 0 input of the carry element is connected to the carry bus, and the 1 input of the sum element is connected to the sum bus.

In this alternative arrangement, the reference potential applied to the carry element 123 and to the steering circuit 135 is selected so that a 1 is stored in the carry element and the steering circuit 135 steers two units of current to the sum bus only if at least two units of current are conducted in the carry bus 127. The reference potential applied to the sum element is selected so that the sum element 125 stores a 1 only if less than three units of current are conducted in the sum bus 128.

A more detailed description of the arrangement and the operation of the adder 40 is presented in the aforementioned copending patent application Ser. No. 120,834, filed in the name of John D. Heightley.

Figure 8:
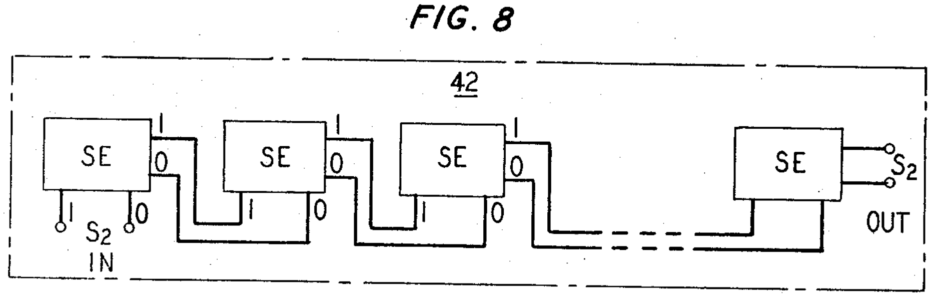
FIG. 8 is a block diagram of a shift register circuit.

Referring now to FIG. 8, there is shown the multistage shift register 42 of FIG. 1. Each of the stages of the shift register is one of the storage elements 110 shown in FIG. 5.

The number of stages in the shift register 42 is determined by the number of bits in each sum code word $S_2$ plus an additional three bits. There are more shift register stages than one for every bit in the sum code word $S_2$ so that the entire magnitude of the sum code word is stored in the register 42 when an overflow correction signal is produced by an overflow correction circuit 200 of FIG. 1. When the sign bit SGN 1 is produced by the adder 40, it is stored simultaneously in the sign store 43 and in its time slot in the register 42. Three clock cycles later after possible overflows are detected and sign changes are made in the sign store 43, the resulting sign bit SGN 1 from the sign store 43 is applied to the two's-complement circuit 46 at the same time that the least significant bit of the sum code word $S_2$ emerges from the output of the shift register 42.

The sign bit SGN 1 stored in the sign store 43 is retained there until its associated code word is processed through the multiplier 52. At that time the sign bit SGN 1 is further used as explained later.

All of the stages of the shift register of FIG. 8 operate in response to the control signals 87 and 88 of FIG. 6. As a result, the bits step sequentially through the stages. Output signals from the shift register 42 of FIG. 8 form a delayed serial bit stream of the sum code word $S_2$.

A more detailed description of the arrangement and the operation of the shift register, shown in FIG. 8, is presented in a copending patent application, Ser. No. 844,752, filed on July 25, 1969, in the name of J. D. Heightley.

Figure 9:
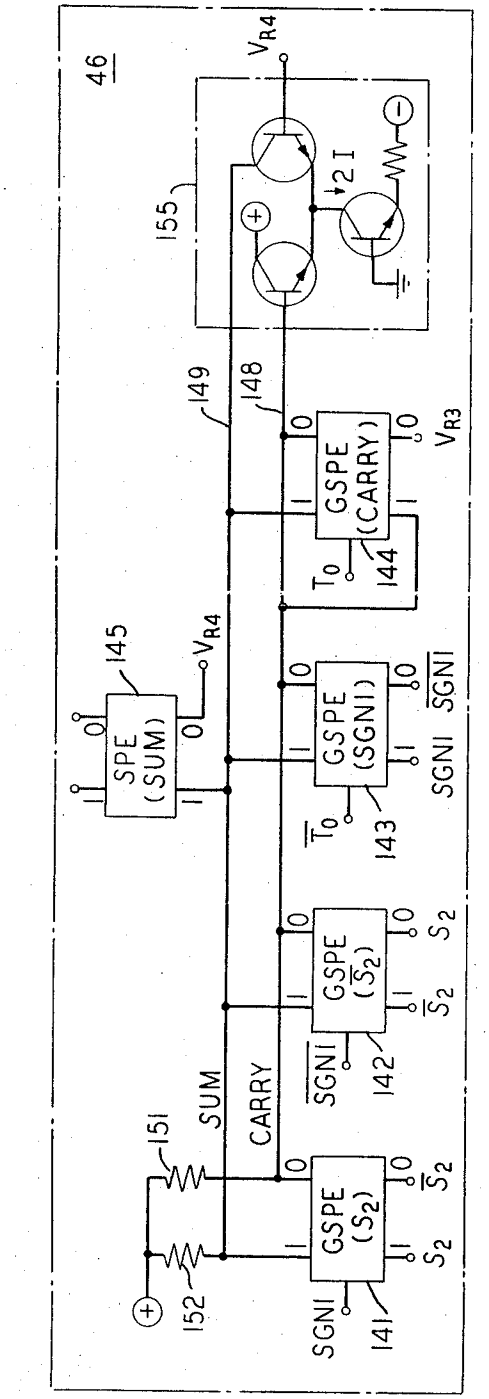
FIG. 9 is a block diagram of a threshold logic two's-complement circuit.

Referring now to FIG. 9, there is shown the threshold logic two's-complement circuit 46 of FIG. 1. The circuit 46 of FIG. 9 includes gated storage-processor elements 141, 142, 143, and 144. Bits of the delayed sum code word $S_2$ from the shift register 42 are applied one at a time in serial sequence to the element 141. At the same time, bits of the complement $\bar{S}_2$ of the delayed sum code word are applied to the element 142. The sign bit SGN 1 which is stored in the sign store register 43 is continuously applied to the control gate of element 141 during the processing of its sum code word. The sign bit complement $\overline{\text{SGN 1}}$ is applied simultaneously to the gate of the element 142. The sign bit SGN 1 and its complement $\overline{\text{SGN 1}}$ remain constant while all of the bits of their associated sum code word are processed through the two's-complement circuit 46.

In taking the two's-complement, the circuit of FIG. 9 is arranged so that a positive code word $S_2$ applied to the element 141 is transferred to an output storage-processor element 145 in a serial bit stream identical to the input bit stream but delayed two clock cycles. In addition, the circuit of FIG. 9 is arranged to add a 1 to the least significant bit of the complement of a negative input code word $S_2$ as the bits are transferred to the element 145. Carries resulting from this addition are stored and processed by the carry element 144. The bit stream is delayed for one clock cycle in the element 141 and for another clock cycle in the element 145. Thus, the two's-complement circuit merely delays the bit stream of any positive code word; and it complements, adds 1, and delays the bit stream of any negative code word.

Gated storage-processor elements 143 and 144 are arranged respectively to store the sign bit SGN 1 and a carry bit. The control gates of the elements 143 and 144 are controlled respectively by pulses $\bar{T}_0$ and $T_0$. The pulse $T_0$ has a high positive potential only during the time slot during which the first bit of each code word is processed through the circuit 46. The pulse $\bar{T}_0$ has a high positive potential during the remaining time while that code word is being processed.

Because complementary gate signals are applied to the pairs of elements 141, 142 and 143, 144, the outputs of only two of the elements are enabled at any one time. While the elements 141, 142, 143, and 144 store bits, the two elements which have enabled outputs each steer a unit of current to one or the other of a pair of busses 148 and 149. The 1 and 0 outputs of the elements 141, 142, 143 and 144 are connected respectively to the sum and carry busses. Potentials on the busses 148 and 149 vary as the number of units of current conducted therethrough varies, because voltage drops across resistors 151 and 152 vary as the currents therethrough change.

The potential on the carry bus 148 is applied to the 1 input of carry element 144 for comparison with a reference potential $V_{R3}$ to determine whether a carry bit 1 is stored or not. Reference potential $V_{R3}$ is selected so that a 1 is set in the carry element 144 only when no units of current are conducted through the carry bus 148.

The potential on the carry bus 148 and a reference potential $V_{R4}$ are applied to opposite inputs of a steering circuit 155 which steers two inputs of current to the sum bus 149 only when at least two units of current are conducted through the carry bus 148.

Potential on the sum bus 149 is compared by the sum element 145 with the reference potential $V_{R4}$ to determine whether a sum bit 1 is stored or not. The potential on the sum bus 149 is applied to the 1 input of the sum element 145, and the reference potential $V_{R4}$ is applied to the 0 input thereof. Reference potential $V_{R4}$ is selected so that a 1 is set in element 145 only if less than two units of current are conducted through the sum bus 149.

Figure 10:
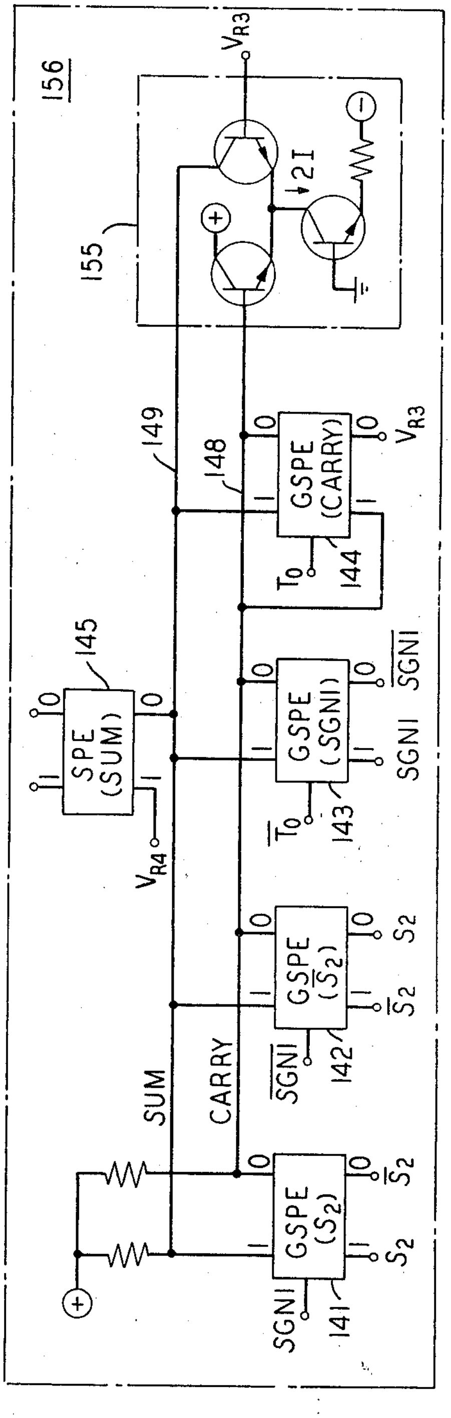
FIGS. 10, 11 and 12 are block diagrams of alternative threshold logic two's-complement circuits.

Referring now to FIG. 10, there is shown an alternative arrangement 156 of the two's-complement circuit. The elements 141, 142, 143 and 144 have their 1 and 0 outputs respectively connected to the sum and carry busses. The 1 input of the carry element is connected to the carry bus 148, and the O input of the sum element 145 is connected to the sum bus 149.

In the arrangement of FIG. 10, the reference potential $V_{R3}$, applied to the 0 input of the carry element 144, is selected so that a 1 is stored in the carry element 144 only if no unit of current is conducted in the carry bus 148. The reference potential $V_{R3}$ is applied to the steering circuit 155 so that it steers two units of current to the sum bus 89 only when at least one unit of current is conducted through the carry bus. Another reference potential $V_{R4}$, applied to the 1 input of the sum element, is selected so that a 1 is stored in the sum element 145 only if at least three units of current are conducted in the sum bus 149.

Although the arrangement of FIG. 10 responds to a different combination of threshold potentials than the circuit of FiG. 9, the arrangement of FIG. 10 nevertheless produces the two's-complement output function.

Figure 11:
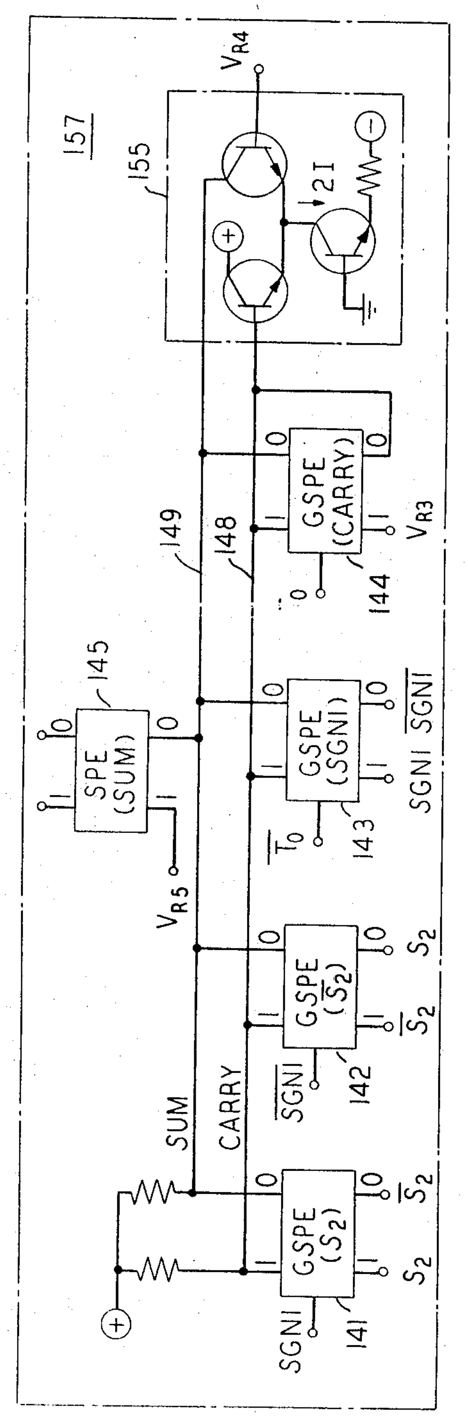

Referring now to FIG. 11, there is shown another arrangement 157 of a two's-complement circuit. The elements 141, 142, 143, and 144 have their 1 and 0 outputs respectively connected to the carry and sum busses. The 0 input of the carry element 144 is connected to the carry bus 148, and the 0 input of the sum element 145 is connected to the sum bus 149.

In the arrangement of FiG. 11, a reference potential $V_{R3}$, applied to the 1 input of the carry element 144, is selected so that a 1 is stored in the carry element 144 only when at least two units of current are conducted through the carry bus 148. Another reference potential $V_{R4}$, applied to the steering circuit 155, is selected so that two units of current are steered to the sum bus 149 only when at least one unit of current is conducted through the carry bus 148. A further reference potential $V_{R4}$, applied to the 1 input of the sum element 145, is selected so that a 1 is stored in the sum element only when at least three units of current are conducted through the sum bus 149.

The arrangement of FIG. 11 also produces the two's-complement output function.

Figure 12:
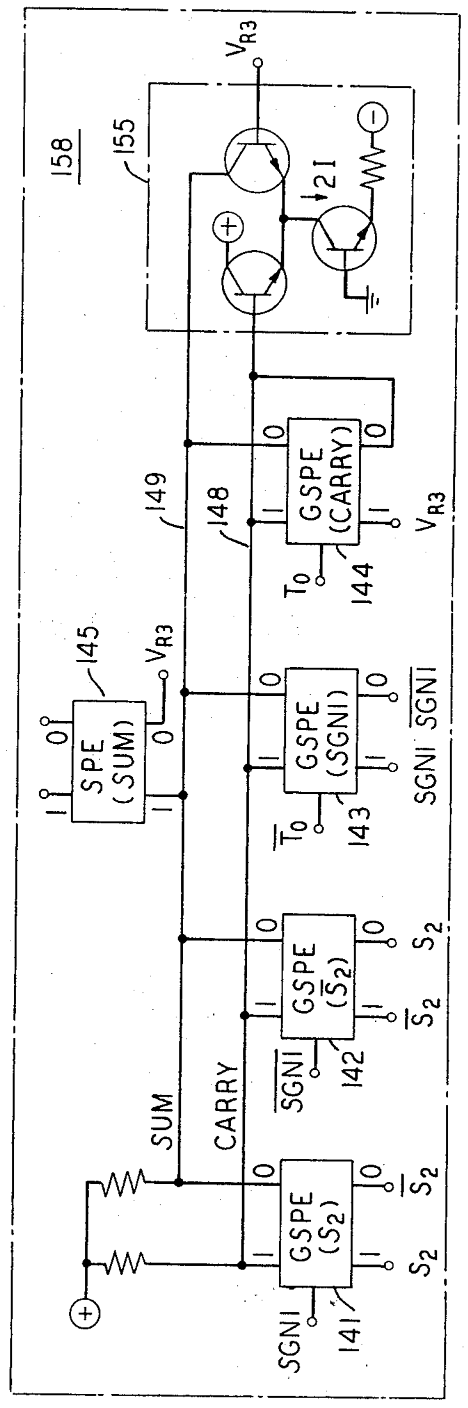

Referring now to FIG. 12, there is shown another embodiment 158 of the two's-complement circuit. The elements 141, 142, 143, and 144 have their 1 and 0 outputs respectively connected to the carry and sum busses. The 0 input of the carry element 144 is connected to the carry bus 148, and the 1 input of the sum element 145 is connected to the sum bus 149.

In the arrangement of FIG. 12, reference potential $V_{R3}$, applied to the 1 input of the carry element and to the steering circuit, is selected so that a 1 is stored in the carry element 144 and the steering circuit 155 steers two units of current to the sum bus 149 only when at least two units of current are conducted through the carry bus 148. The reference potential $V_{R3}$ also is applied to the O input of the sum element 145 so that the sum element stores a 1 only when less than two units of current are conducted through the sum bus 149.

The arrangement of FIG. 12 also produces the two's-complement output function.

All of the arrangements of the two's-complement circuit 46 operate in response to the control signals shown in FIG. 6 and applied concurrently to the storage-processor elements of the FIGS. 9, 10, 11, and 12. In response to the signals of FIG. 6, input bits are stored in the elements 141, 142, 143, and 144 at time $t_3$ of one clock cycle. The resulting two's-complement bit and its carry bit are stored respectively in the sum and carry elements 145 and 144 at time $t_3$ of the next subsequent clock cycle. Thus the two's-complement operation requires one clock cycle and the output bit stream is delayed one additional clock cycle in the element 145.

A more detailed description of the operation of the two's-complement circuit is presented in the previously mentioned patent application, Ser. No. 120,834, filed in the name of J. D. Heightly.

Output signals from the sum element 145 are applied directly to the input of the shift register 47 of FIG. 1. The shaft register 47 is similar to the shift register 42 previously described except that the shift register 47 has a different number of stages.

The number of stage in the shift register 47 is determined by multiplying the total number of channels multiplexed at the input of the adder 40 by the number of bits in each sample code word and subtracting the clock cycles of delay imposed by each of the other circuits in the upper left-hand loop of the digital filter 20, as shown in FIG. 1.

Signals emerging from the output of the shift register 47 are applied by way of the path 49 to the input of the multiplier 52.

Figure 13:
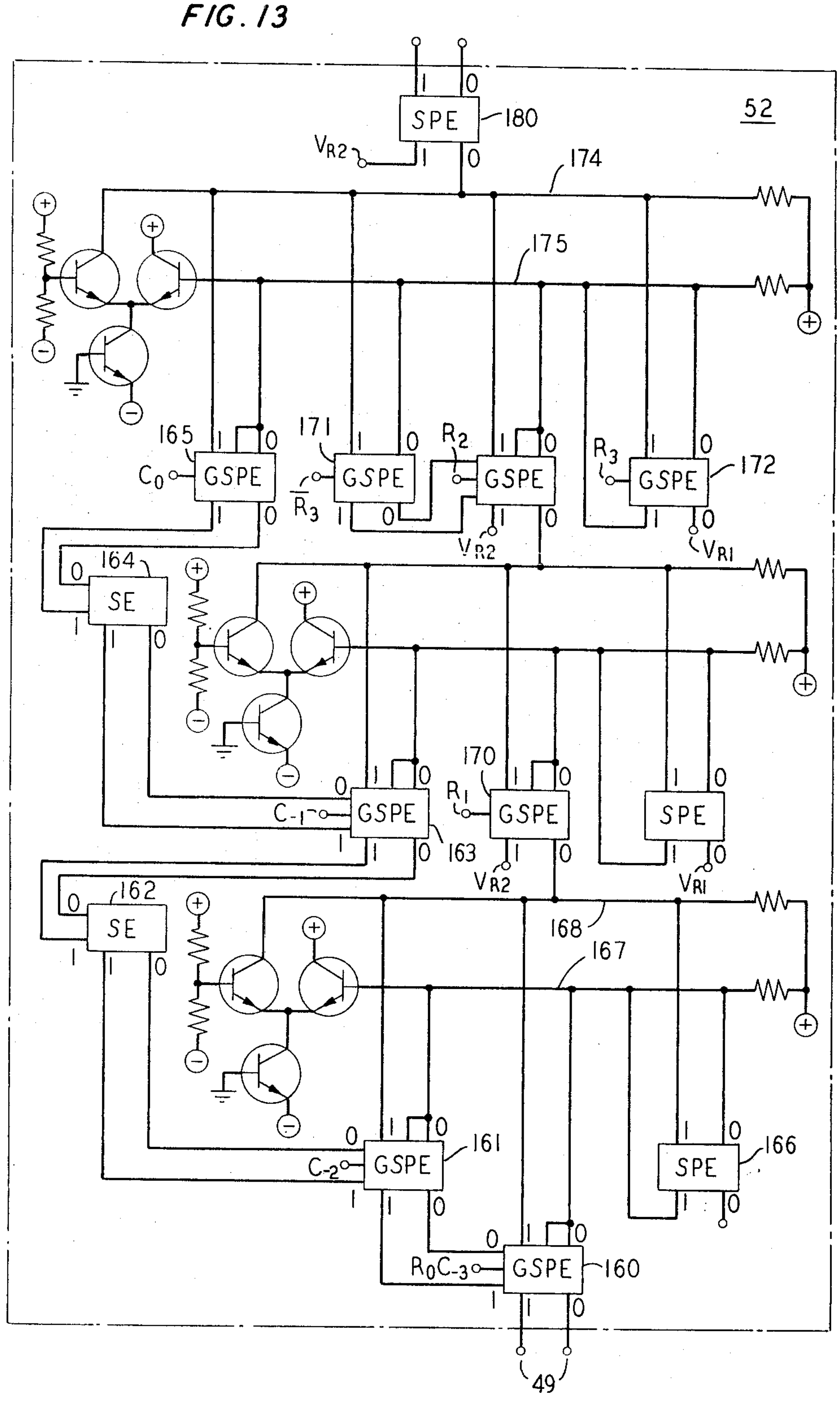
FIG. 13 is a block diagram of a threshold logic serial multiplier circuit.

Referring now to FIG. 13, there is shown a diagram of the threshold logic serial multiplier 52 of FIG. 1, which multiplies bits of the code word with bits of the coefficient $b_1$ and accumulates resulting partial products. Coefficient $b_1$, like the code word, is a binary number and may have a magnitude that is greater than 1. As previously mentioned with respect to the coefficient $b_k$, the value of the coefficient $b_1$ is determined by the required transfer function of the filter. The bits of the coefficient $b_1$ are indicated by the symbol $C_{-3}C_{-2}$, $C_{-1}$, and $C_0$ in ascending significance.

As previously described, the sample code word was converted into the sign-magnitude representation by the two's-complement circuit 46 and was delayed by the shift register 47. The resulting delayed code word is to be multiplied with the coefficient. It should be recalled that the sign component SGN 1 of the sample code word is stored in the sign store register 43 until the magnitude component of the code word is processed by the multiplier 52.

In the multiplier 52 of FIG. 13, the sample code word is applied to the input terminals 49, which are designated by the same indicator as the path 49 in FIG. 1.

The multiplier 52 includes two major parts. One of the parts is a shift register for delaying the bit stream of the code word and for multiplying those bits with bits of the coefficient $b_1$. A second part of the multiplier is a series of threshold logic adder circuits for accumulating partial products from the products of the code word bits and coefficient bits.

A tandem sequence of gated storage-processor elements and storage elements 160, 161, 162, 163, 164, and 165 is arranged as a shift register for stepping along bits of the sample code word. Each element of the tandem sequence delays the stream of bits for one clock cycle. Even though there are some gated storage-processor elements 160, 161, 163, and 165 included in the shift register of the multiplier 52, all of the elements 160–165 are interconnected substantially the same as the elements of the shift register 42, for purposes of the shifting operation. For convenience, the shifting operation output terminals of the elements 160–165 are located on the left sides of those elements in FIG. 13.

Besides participating in the shifting operation, each one of the gated storage-processor elements 160, 161, 163, and 165 multiplies one of the bits of the coefficient $b_1$ with a different one of the bits of some sample code word during each clock cycle. These binary multiplications are performed by logical AND operations to produce bits of partial products. The bits $C_{-3}$, $C_{-2}$, $C_{-1}$, and $C_0$ of the coefficients $b_1$, stored in memory 50 of FIG. 1, are applied respectively to the gate control terminals of the elements 160, 161, 163, and 165 in ascending order of significance.

These bits of the coefficient $b_1$ selectively force a unit of current to the 0 outputs of the elements 160, 161, 163, and 165 when the coefficient bit signals are at a high positive potential representing each 0 in the coefficient $b_1$. Each 0 of the coefficient applied to a control gate terminal forces a unit of output current to the 0 output of that element because the high level representing the 0 is higher than either of the data inputs to the element.

The bit signals are near ground for representing each 1 in the coefficient. Each 1 of the coefficient $b_1$ allows the bits of the sample code word stored in the element to steer the unit of current either to the 1 output or to the 0 output as determined by the data.

As partial product bits are produced from the multiplication of the coefficient bits and the sample code word bits, the partial product bits are accumulated as bits of the product code word. Such accumulation is accomplished by a series of three threshold logic adder circuits, which are similar to the adder circuit 40, previously described.

Each of the three adders processes two bits having the same significance and any carry from the order of next lower significance. Since the three adders are substantially alike only the first adder will be described in detail.

In the first adder, elements 160 and 161 store consecutive bits of the code word. The bit stored in element 160 is multiplied by the combination $R_0C_{-3}$ (an AND combination of a rounding bit $R_0$ and the coefficient bit $C_{-3}$) because a signal representing the combination $R_0C_{-3}$ is applied to the gate control terminal of element 160. The bit stored in element 161 is multiplied by the coefficient bit $C_{-2}$ because a signal representing that coefficient bit is applied to the gate control terminal of element 161. Thus the resulting output currents from the elements 160 and 161 represent partial product bits produced by multiplying the code word bits with bits of the coefficient $b_1$.

A storage-processor element 166 is arranged as a carry element in the first adder.

Output units of current from the elements 160, 161, and 166 are steered to a carry bus 167 and a sum bus 168 in accordance with the description of the adder 40 except when the outputs of the elements 160 and 161 are forced to the 0 output terminals by control signals. These units of current determine potentials on the busses 167 and 168. A steering circuit and a sum element 170 respond to the potentials on the busses, as in the adder 40 previously described.

When the sum of the bits of the partial product is accumulated in the sum element 170, a rounding control signal $R_1$ is applied to the gate control terminal of the element 170. This rounding control signal is applied to force the output of the element 170 to 0 whenever the bit stored in element 170 and the bit concurrently stored in the element 163 are partial product bits from different code words.

The last adder at the top of FIG. 13 is similar to the first adder except that there is an additional element 171 for storing a delayed cumulative sum. This delayed cumulative sum element 171 and a carry element 172 are gated storage-processor elements controlled by additional rounding control signals $\overline{R}_3$ and $R_3$. These two rounding control signals alternatively disable the outputs of the carry element 172 and the delayed cumulative sum element 171 so that only one of those elements can provide current to the sum bus 174 or to the carry bus 175 during any one clock cycle.

A sequence of product bits is determined by and is stored in a product magnitude storage-processor element 180. The sequence of product bits in the sign-magnitude representation is stepped out of the element 180 and is applied to the input of the two's-complement circuit 53 of FIG. 1 for translation into the two's-complement representation of the product code word.

The last bit $M_1$ of each product code word produced by the multiplier 52 is the sign bit which equals 0 except when an overflow occurs in the multiplier 52. Whether or not an overflow occurs, a product sign bit SGN $P_1$ is used to control the two's-complement circuit 53 of FIG. 1.

Product sign bit SGN $P_1$ is derived by a modulo 2 addition of the stored sign bit SGN 1 and the sign bit SGN $b_1$ of the coefficient. This addition is performed by an adder 181 of FIG. 1 while the product is being formed in the multiplier so that the product sign bit SGN $P_1$ can be applied to the two's-complement circuit 53 as soon as the first bit of the product code word is available at the output of the multiplier 52.

The two's-complement circuit 53 and the adder 55 of FIG. 1 are respectively like the two's-complement circuit 46 and the adder 40 except that they operate on code words which have been further processed.

A sequence of signals produced as the summation from the adder 55 is the augend $S_1$ that is applied to the adder 40.

There is sufficient delay around the upper left-hand loop so that the augend code word $S_1$ is delayed by one sample period from the time its original sample code word $A_2$ was first applied to the adder 40.

Figure 14:
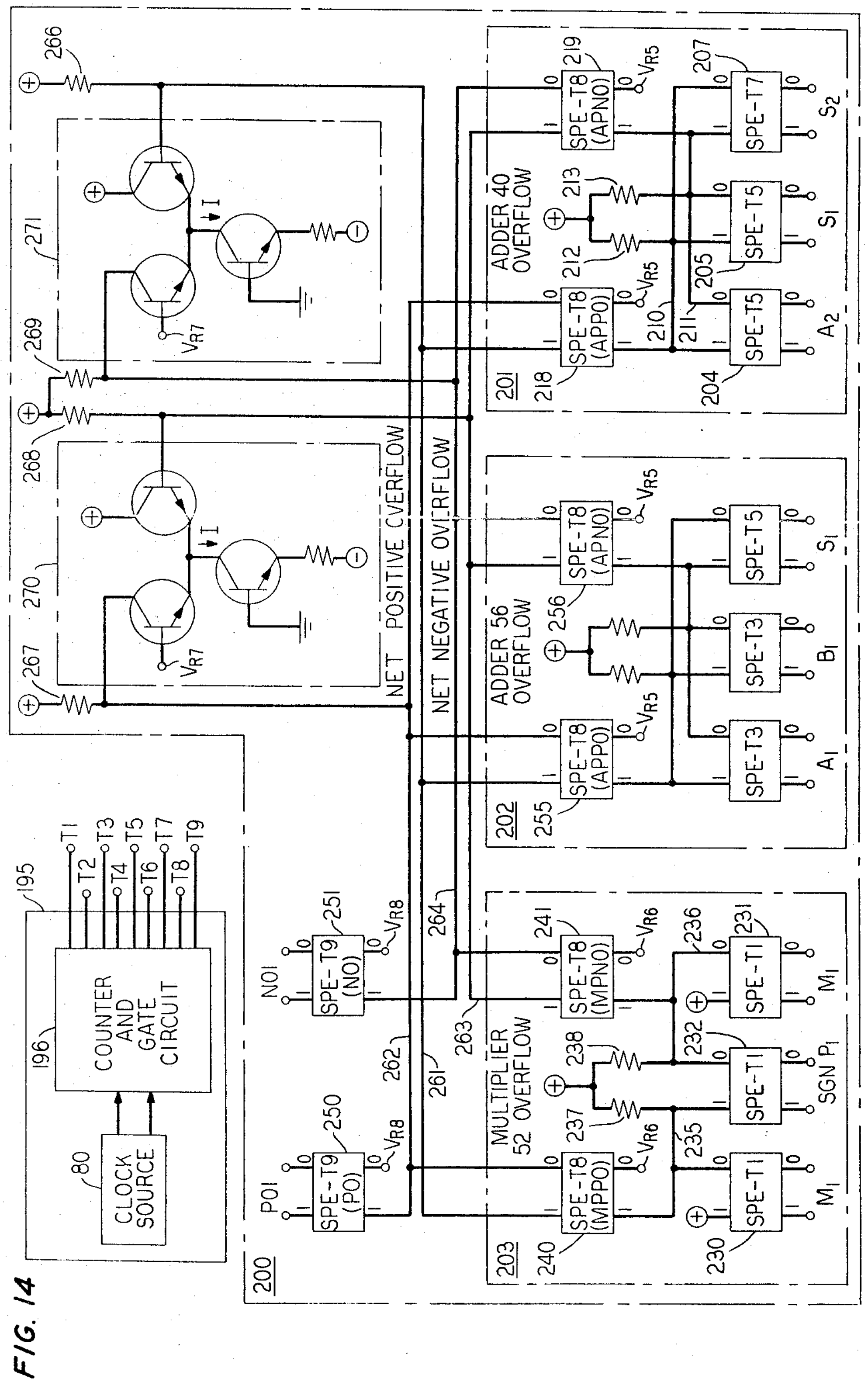
FIG. 14 is a block diagram of a threshold logic overflow detection circuit for the digital filter of FIG. 1.

Referring now to FIG. 14, there is shown a threshold logic overflow detection circuit 200. The logic functions performed by the circuit 200 occur in response to a pair of bias control signals from the clock source 80 included in a clock control circuit 195. The clock control circuit 195 includes a conventional counter and gate control circuit 196 for directing individual cycles of the clock control signals to separate pairs of output leads T1, T2, T3, T4, T5, T6, T7, T8, and T9 only during the clock cycles of FIG. 6, identically designated on the pairs of leads. During all clock cycles other than the clock cycle designated on each pair of leads of the control circuit 195, that pair of leads carries storage bias signals.

The circuit 200 includes five major parts. Two of the major parts are adder overflow detection circuits 201 and 202. A third major part of the circuit 200 is a multiplier overflow detection circuit 203. The adder and, multiplier detection circuits 201, 202, and 203 are threshold logic circuits for detecting positive and negative overflows that occur in the adders 40 and 55 and in the multiplier 52 of FIG. 1.

The adder overflow detection circuit 201 and 202 are substantially alike except for the fact that different inputs are applied to each of them. Detection circuit 201 receives input signals from the adder 40, and the detection circuit 202 receives input signals from the adder 55. The input signals from the adders 40 and 55 are available at different times because of delays occurring in the addition processes.

Since the adder overflow detection circuits are basically alike, only the detection circuit 201 will be described hereinafter.

Sign bits of the sample code word $A_2$, the augend code word $S_1$, and the resulting sum code word $S_2$ are stored respectively in storage-processor elements 204, 205, and 207 during different clock cycles when those bits are available for storage.

The times for storage are given relative to each other by designators shown in the blocks. For instance, the element 204 stores the sign bit from the addend $A_2$ during the clock cycle T5, and the element 205 stores the sign bit from the augend $S_1$ during the clock cycle T5. The elements 204 and 205 retain such sign bits until another sign bit is available at the end of a word processing cycle.

All of the storage-processor elements shown in FIG. 14 include clock cycle designators for showing the clock cycle during which new information is stored therein.

In circuit 201, the elements 204, 205, and 207 each steers one unit of current to one or the other of a pair of busses 210 and 211 while information is stored in those elements. Potentials on the busses 210 and 211 vary in a predetermined manner because voltage drops across resistors 212 and 213 vary with changes of current conducted therethrough.

The potential on each of the busses 210 and 211 is compared separately with a reference potential $V_{R5}$. The potential of the bus 210 and the references potential $V_{R5}$ are applied to adder partial positive overflow element 218 which stores a 1 only if no unit of current is conducted in the bus 210 during the clock cycle T8. The potential of the bus 211 and the reference potential $V_{R5}$ are applied to adder partial negative overflow element 219 which stores a 1 only if no unit of current is conducted in the bus 211 during the clock cycle T8.

Thus, a 1 is stored in the element 218 only when the signs of the sample code word $A_2$ and augend $S_1$ are positive and the sign of the resulting sum $S_2$ is negative. Additionally, a 1 is stored in element 219 only when the signs of the sample code word $A_2$ and augend $S_1$ are negative and the sign of the resulting sum $S_2$ is positive.

Storage of a 1 in either the element 218 or 219 indicates an overflow has occurred in the adder 40 of FIG. 1. If the overflow is positive, the 1 is stored in element 218, and if the overflow is negative the overflow is stored in element 219.

Thus, the adder overflow detector 201 accomplishes two's-complement addition overflow detection because overflows only occur in a two's-complement addition when the addend and augend have similar signs and the resulting sum word has a sign of opposite polarity.

In an alternative arrangement of the adder overflow detector circuit 201, the reference voltage $V_{R5}$ is applied to the 1 inputs of the elements 218 and 219, and the busses 210 and 211 are connected respectively to the 0 inputs of the elements 219 and 218. In this alternative arrangement, the reference potential $V_{R5}$ is selected so that the elements 218 and 219 each store a 1 only if three units of current are conducted in their respective busses 211 and 210.

The multiplier overflow detection circuit 203 determines whether an overflow has occurred in the multiplication of the magnitude of the sample code word with the coefficient $b_1$. Such an overflow is indicated by the sign bit $M_1$ of the magnitude code word shifted out of the multiplier 52. Polarity of the overflow is determined by the product sign bit SGN $P_1$. These sign bits $M_1$ and SGN $P_1$ therefore are applied to the multiplier overflow detection circuit 203.

The sign bit $M_1$ is stored in two storage-processor elements 230 and 231, and the sign bit SGN $P_1$ is stored in storage-processor element 232 during the clock cycle T1. The sign bit $M_1$ of the product magnitude code word determines whether or not an overflow occurred because that bit is a 0 except when an overflow occurs. The product sign bit SGN $P_1$ determines which polarity of overflow has occurred whenever an overflow occurs.

While the elements 230, 231, and 232 store the sign bits $M_1$ and SGN $P_1$, the elements steer currents to busses 235 and 236 depending upon the value of the bit stored. Potentials on the busses 235 and 236 vary in a predetermined manner because voltage drops across resistors 237 and 238 vary with changes of current conducted therethrough.

Potentials on the busses 235 and 236 are compared with a reference potential $V_{R6}$ by two elements. A multiplier partial positive overflow element 240 compares the potential on bus 235 with the reference potential $V_{R6}$, and a multiplier partial negative overflow element 241 compares the potential on bus 236 with the reference potential $V_{R6}$.

The elements 240 and 241 are set to 1 only when no unit of current is conducted respectively through the busses 235 and 236 during the clock cycle T8. A 1 thus stored in elements 240 and 241 respectively indicates that a positive overflow and a negative overflow occurred during the last previous multiplication of a code word in the multiplier 52. Obviously only a positive or a negative overflow but not both occurs as a result of the multiplying one sample word with coefficient $b_1$.

In an alternative arrangement of the multiplier overflow detector circuit 203, the 0 outputs of the elements 230 and 231 are connected to the positive power supply. Their 1 outputs are connected respectively to the busses 235 and 236, and the 0 and 1 outputs of the element 232 are connected respectively to the busses 235 and 236. The reference potential $V_{R6}$ is applied to the 1 inputs of the elements 240 and 241, and the 0 inputs of those elements are connected respectively to the busses 235 and 236.

Reference potential $V_{R6}$ for the alternative arrangement of the detector circuit 203 is selected so that the elements 240 and 241 are set to 1 only when two units of current are conducted respectively through the busses 235 and 236 during the clock cycle T8.

Control signals similar to the signals of FIG. 6 are applied to all of the storage-processor elements of the detection circuit 200 at the selected clock cycles shown in FIG. 14. In response to such control signals, the bits are stored and then transferred to the next element along the sequence of elements at the time shown in the next element.

The outputs of the adder and multiplier overflow detection circuits 201, 202, and 203 are coupled through threshold logic circuits to a net positive overflow element 250 and a net negative overflow element 251.

Outputs of the storage-processor elements 218, 219, 240, 241, 255 and 256 are interconnected with four busses 261, 262, 263, and 264. Units of current are steered to the busses 261, 262, 263, and 264 in accordance with bits stored in the elements 218, 219, 240, 241, 255, and 256.

Potentials on the busses 261, 262, 263, and 264 vary in a predetermined manner because voltage drops across resistors 266, 267, 268, and 269 vary with changes of the number of units of current conducted therethrough.

Potentials on the busses 261 and 263 are compared with a reference voltage $V_{R7}$ by steering circuits 270 and 271. The circuit 270 steers a unit of current to the net positive overflow bus 262 only when at least one unit of current is conducted in the bus 263 indicating that a negative overflow occurred in one or more of the following circuits: adder 40, adder 55, and multiplier 52. The circuit 271 steers a unit of current to the net negative overflow bus 264 only when at least one unit of current is conducted through the bus 261 indicating that a positive overflow occurred in one or more of the following circuits: adder 40, adder 55, and multiplier 52.

Potential on the net positive overflow bus 262 is compared with a reference potential $V_{R8}$ to determine whether or not a net positive overflow has occurred in the upper left-hand loop of the digital filter 20, shown in FIG. 1. The potential $V_{R8}$ is selected so that the net positive overflow element 250 is set to a 1 only if less than three units of current are conducted through the net positive overflow bus 262 during the clock cycle T9.

In addition the net negative overflow element 251 compares the potential of the net negative overflow bus 264 with the potential $V_{R8}$. Element 251 is set to a 1 only if less than three units of current are conducted through the bus 264 during clock cycle T9.

Thus the threshold logic overflow detection circuit 200 detects all possible net overflows occurring in the adders 40 and 55 and the multiplier 52 while those circuits are processing the same code word.

Outputs of the net positive and net negative overflow elements 250 and 251 are coupled through leads to the sign store register 43 and to the output of the two's-complement circuit 46 of FIG. 1. The net positive overflow (P01) and the net negative overflow (N01) signals are applied to the sign store 43 to override whatever bit is stored therein when a net overflow is detected. In addition, the net positive overflow (P01) and net negative overflow (N01) signals are applied to the two's-complement circuit 46 for changing to full scale the sample code word which includes the net overflow. The sample code word is changed to full scale by forcing all magnitude bits to 1 and leaving the sign bit at 0.

A more complete description of the arrangement and operation of the overflow detection circuit 200 is presented in another patent application Ser. No. 120,833 filed on Mar. 4, 1971, now U.S. Pat. No. 3,700,874 and in the name of the same inventor, as the instant application.

The foregoing description of the individual blocks in the upper left-hand loop of the digital filter of FIG. 1 is sufficient to fully describe the arrangement and operation of that loop of the digital filter. The other three loops of the digital filter include arrangements of similar blocks that can be implemented by means of circuits similar to the circuits of FIGS. 7, 8, 9, and 13 or their alternative arrangements.

Only one overflow detection circuit is required for stability in the entire digital filter 20. Overflows do not occur in the other loop on the left-hand side because the coefficient $b_2$ of that loop always is less than one, insuring that the magnitude of any resulting product is less than the multiplicand. Overflows do not occur in the lower right-hand loop because for all practical applications the coefficient $a_2$ equals unity, insuring that the resulting product equals the multiplicand.

Another overflow detector 300 may be included in the feed-forward part of the digital filter 20 for reducing noise generated by overflows in the right-hand portion of the filter.

Output signals from the digital filter of FIG. 1 are groups of sample code words that have been processed in accordance with a predetermined relationship. As previously mentioned, the output sequence of code words at the output 22 represents the input sequence of sets of bits transformed by a predetermined difference equation.

The above-detailed description is illustrative of an embodiment of the invention, and it is understood that additional embodiments thereof will be obvious to those skilled in the art. These additional embodiments are considered to be within the scope of the invention.

What is claimed is:

1. A digital filter comprising means for receiving a first sequence of sets of bits, each set representing one amplitude sample of a continuously variable signal, each sample being taken at a different one of a series of equally spaced instants during an interval, means storing a set of coefficients, and means responsive to the first sequence of sets and the set of coefficients for producing a second sequence of sets of bits related to the first sequence of sets by a predetermined finite difference equation, said producing means including plural threshold logic circuits, each threshold logic circuit including sum and carry busses, plural bistable circuits for storing sample bits and for selectively directing units of current through the sum or carry bus depending upon the states of the sample bits stored therein, bistable means for storing a carry bit and for selectively directing a unit of current through the sum or carry bus depending upon the state of the stored carry bit, means responsive respectively to the units of current conducted through the sum and carry busses for producing predetermined potentials thereon, plural reference potentials, means responsive to the potential of the carry bus and to one of the reference potentials for selectively steering two units of current through the sum bus, and means for comparing the potential of the sum bus with another reference potential to determine one of two possible output conditions.

2. A digital filter in accordance with claim 1 wherein the threshold logic circuits are arranged in first and second loop circuits, each loop circuit including first and second threshold logic adders the first adder of the first loop circuit including the receiving means, a threshold logic multiplier for producing product code words, threshold logic means for producing two's-complements of the product code words and for applying resulting two's-complement code words to an input of the second adder of the same loop circuit, and means for applying signals from the second adder to the first adder of the same loop circuit, means for coupling signals from the first adder of the first loop circuit to the first adder of the second loop circuit, the first and second loop circuits further including a common branch circuit comprising means for delaying output signals from the first adder of the first loop circuit, means for producing two's-complements of delayed signals from the first adder of the first loop circuit, and means for delaying output signals from the common two's-complement means and for applying delayed signals to the multipliers of the first and second loop circuits, and the first adder of the second branch circuit including means for producing the second sequence of sets of bits.

3. A digital filter in accordance with claim 2 comprising means for further delaying output signals from the two's-complement delaying means third and fourth loop circuits, each including threshold logic means for multiplying delayed signals from the further delaying means with coefficient signals to produce product code words, and threshold logic means for producing two's-complements of the product code words in the same loop circuit, means for applying the resulting two's-complement code word of the third loop circuit to the second adder of the first loop circuit, and means for applying the resulting two's-complement code word of the fourth loop circuit to the second adder of the second loop circuit.

4. A digital filter in accordance with claim 3 wherein each of the threshold logic adders comprise first and second reference potentials, means responsive to the potential of the carry bus and to the first reference potential for selectively steering two units of current to the sum bus only if at least two units of current are conducted through the carry bus, and bistable means for comparing the potential of the sum bus with the second reference potential and for assuming a first stable state when at least three units of current are conducted through the sum bus and for assuming a second stable state when less than three units of current are conducted through the sum bus.

5. A digital filter in accordance with claim 4 wherein the threshold logic means producing two's-complements comprise means for selectively disabling conduction of the units of current from the storing means to the sum and carry busses, third and fourth reference potentials, means responsive to the potential of the carry bus and to the third reference potential for selectively steering two units of current to the sum bus only if two units of current are conducted in the carry bus, and means for comparing the potential of the sum bus with the fourth reference potential for storing a 1 therein only if less than two units of current are conducted in the sum bus.

6. A digital filter in accordance with claim 5 further comprising means for storing sign bits of sample code words, the first, second, third, and fourth loops further comprise means for storing a sign bit of a predetermined coefficient, means responsive to the sign bit of one sample code word and to the sign bit of the predetermined coefficient for producing a product sign bit, and means responsive to the product sign bit for controlling the two's-complementing means of the same loop.

7. A digital filter in accordance with claim 6 further comprising threshold logic means for detecting all possible net overflows occurring in a code word processed by the combination of the first and second adders and the multiplier of the first loop.

8. A digital filter in accordance with claim 4 wherein the threshold logic means producing two's-complements comprise means for selectively disabling conduction of the units of current from the storing means to the sum and carry busses, third and fourth reference potentials, means responsive to the potential of the carry bus and to the third reference potential for selectively steering two units of current to the sum bus only if at least one unit of current is conducted in the carry bus, and means for comparing the potential of the sum bus with the fourth reference potential for storing a 1 therein only if at least three units of current are conducted in the sum bus.

* * * * *